US008971917B2

(12) United States Patent
Andrews

(10) Patent No.: US 8,971,917 B2
(45) Date of Patent: Mar. 3, 2015

(54) LOCATION-BASED NETWORK RADIO PRODUCTION AND DISTRIBUTION SYSTEM

(75) Inventor: Christopher C. Andrews, Los Altos, CA (US)

(73) Assignee: Soundlink, Inc., Los Altos, CA (US)

( * ) Notice: Subject to any disclaimer, the term of this patent is extended or adjusted under 35 U.S.C. 154(b) by 336 days.

(21) Appl. No.: 13/435,072

(22) Filed: Mar. 30, 2012

(65) Prior Publication Data

US 2012/0252484 A1    Oct. 4, 2012

Related U.S. Application Data

(60) Provisional application No. 61/471,541, filed on Apr. 4, 2011, provisional application No. 61/471,548, filed on Apr. 4, 2011, provisional application No. 61/471,552, filed on Apr. 4, 2011, provisional application No. 61/582,164, filed on Dec. 30, 2011, provisional application No. 61/488,954, filed on May 23, 2011.

(51) Int. Cl.
*H04W 4/02* (2009.01)

(52) U.S. Cl.
CPC ..................................... *H04W 4/021* (2013.01)
USPC .................. 455/456.1; 455/556.1; 455/556.2; 455/566; 709/201; 709/217; 709/231

(58) Field of Classification Search
CPC ......... G06F 41/00; H04W 56/00; H04L 12/00
USPC ........................................ 709/231; 455/456.1
See application file for complete search history.

(56) References Cited

U.S. PATENT DOCUMENTS

| | | | |
|---|---|---|---|
| 6,909,999 B2 | 6/2005 | Thomas et al. | |
| 7,680,288 B2 | 3/2010 | Melchior et al. | |
| 8,606,383 B2 * | 12/2013 | Jung et al. | ........................ 700/94 |
| 2002/0053078 A1 | 5/2002 | Holtz et al. | |
| 2002/0091762 A1 | 7/2002 | Sohn et al. | |
| 2003/0030659 A1 | 2/2003 | Wu | |
| 2008/0103906 A1 | 5/2008 | Singh | |
| 2008/0178251 A1 | 7/2008 | Shin | |
| 2009/0150445 A1 | 6/2009 | Herberger et al. | |
| 2009/0164034 A1 | 6/2009 | Cohen et al. | |
| 2009/0164902 A1 | 6/2009 | Cohen et al. | |
| 2009/0186631 A1 * | 7/2009 | Masarie, Jr. | ................ 455/456.3 |
| 2009/0198357 A1 | 8/2009 | Logan et al. | |
| 2010/0009698 A1 | 1/2010 | Yang et al. | |
| 2010/0106852 A1 * | 4/2010 | Kindig et al. | .................. 709/231 |
| 2010/0114934 A1 * | 5/2010 | Martensson | .................. 707/769 |
| 2010/0180753 A1 | 7/2010 | Chou et al. | |

(Continued)

OTHER PUBLICATIONS

"Grace Digital Audio User Guide GDI-IR1000"—Sirius Retail, May 2010 http://www.siriusretail.com/product/Product_Families/SIRIUS/tab_inc/pdf/GDI-IR1000_UserGuide.pdf.*

*Primary Examiner* — Randy Scott
(74) *Attorney, Agent, or Firm* — Haverstock & Owens LLP

(57) ABSTRACT

A location-based radio system including a storage database and a computing device coupled with the storage database. The computing device includes an application that determines a location of a listener computing device that is accessing a radio station and plays audio content associated with one or more locations on the listener computing device if the location of the listener computing device corresponds to the one or more locations associated with the audio content.

53 Claims, 2 Drawing Sheets

(56) References Cited

U.S. PATENT DOCUMENTS

2010/0235466 A1 9/2010 Jung et al.
2010/0250587 A1 9/2010 Schmitz
2011/0040397 A1 2/2011 Kraemer et al.
2011/0061108 A1 3/2011 Arrasvuori et al.
2012/0254223 A1* 10/2012 Jotanovic et al. ............ 707/769

* cited by examiner

LOCATION-BASED NETWORK RADIO PRODUCTION AND DISTRIBUTION SYSTEM

CROSS-REFERENCE TO RELATED APPLICATIONS

This application claims priority from U.S. Provisional Patent Application Ser. No. 61/471,541, filed Apr. 4, 2011 and entitled "AUDIO COMMENTING SYSTEM FOR THE INTERNET INCLUDING WEBSITES, SOCIAL NETWORKS, AND BLOGS," U.S. Provisional Patent Application Ser. No. 61/471,548, filed Apr. 4, 2011 and entitled "AUTOMATED SYSTEM FOR CREATING AND PUBLISHING INTERNET-BASED AUDIO PROGRAMMING," U.S. Provisional Patent Application Ser. No. 61/471,552, filed Apr. 4, 2011 and entitled "AUDIO RECORDING, PLAYBACK, AND PUBLISHING SYSTEM FOR CREATING VOICEOVERS, SOUNDTRACKS AND OTHER AUDIO PROGRAMMING FOR INTERNET CONTENT INCLUDING WEBSITES AND SOCIAL NETWORKS," and U.S. Provisional Patent Application Ser. No. 61/582,164, filed Dec. 30, 2011 and entitled "AUTOMATIC AUDIO RECORDING AND PUBLISHING SYSTEM," U.S. Provisional Patent Application Ser. No. 61/488,954, filed May 23, 2011 and entitled "LOCATION-BASED INTERNET RADIO PRODUCTION AND DISTRIBUTION SYSTEM," all of which are hereby incorporated herein by reference in its entirety.

FIELD OF THE INVENTION

The present invention relates to the field of location-based audio. Specifically, the present invention is directed to the creation and distribution of location-based radio productions.

BACKGROUND OF THE INVENTION

The Internet and cable TV technologies have allowed "narrowcasting" to become a common practice, whereby a specific (narrow) list of recipients receive a program, a video or audio program designed for that specific list. This list of recipients may be defined by demographics, interests, values, or other attributes. The recipient of a narrowcast may be receiving the program because they subscribe to a certain cable channel or website. This is as opposed to the broadcast model, where anyone (i.e. the public) with the equipment is able to access a program. In contrast, traditional terrestrial radio stations broadcast radio to people within a specific geographic area and thus everyone within that area receives the same program at the same time.

SUMMARY OF THE INVENTION

The location-based radio system described herein enables anyone to create and distribute network-based radio stations that are sensitive to the geographic location of the listener. Specifically, the creator of the station is able to adjust which audio is played over the radio system for the listener based on the location of the listener. In some embodiments, the output audio is able to also be adjusted based on other factors including whether the listener is traveling by car, walking, using a train, the speed the listener is moving or if the listener is stationary. Additionally, the system enables the listener to modify the audio output by the radio station by inputting one or more preferences into the station such as whether they are looking for entertainment or news.

A first aspect of the present application is directed to a method of providing a location-based radio station. The method comprises storing audio content on a storage database and associating the audio content with one or more locations on an association table, determining a location of a listener computing device that is accessing a radio station associated with the audio content and playing the audio content on the listener computing device if the location of the listener computing device corresponds to the one or more locations of the location data elements associated with the audio content. In some embodiments, the method further comprises creating the radio station and storing the radio station in a database of stations. In some embodiments, wherein one or more of the locations are associated with one or more times or one or more dates. In some embodiments, the method further comprises playing generic audio content on the listener computing device if the location of the listener computing device does not correspond to the one or more locations, wherein the generic audio content is not associated with a location. In some embodiments, the association table is stored on the storage database. In some embodiments, the database of stations is located in the storage database. In some embodiments, the method further comprises importing new audio content from an audio recording mechanism or a memory to the storage database. In some embodiments, the method further comprises associating the new audio content with one or more of the locations and recording the associations in the association table. In some embodiments, creating the radio station comprises selecting content pool settings of the radio station, wherein the content pool settings comprise one or more parameters the values of which the audio content must meet in order to be played by the radio station. In some embodiments, the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content. In some embodiments, each of the locations represent an area having a size. In some embodiments, creating the radio station comprises selecting location data settings of the radio station, wherein the location data settings indicate a range of sizes that the area of one of the locations must fall within in order for the radio station to play the audio content associated with the one of the locations. In some embodiments, the location data settings indicate priorities between locations having different sized areas, wherein audio content associated with locations having prioritized sizes of areas will be played before other audio content associated with locations having lesser prioritized sizes of areas when the listener device is in those locations.

A second aspect of the present application is directed to a non-transitory computer-readable medium storing instructions that when executed by a computing device cause the computing device to perform the method comprising determining a location of a listener computing device that is accessing a radio station associated with audio content, wherein the audio content is associated with one or more locations and playing the audio content on the listener computing device if the location of the listener computing device corresponds to the one or more locations associated with the audio content. In some embodiments, the method further comprises storing the audio content on a storage database and associating the audio content with the one or more locations on an association table. In some embodiments, the method further comprises creating a radio station and storing the radio station in a database of stations. In some embodiments, the locations are associated with one or more times or one or more dates. In some embodiments, the method further comprises playing generic audio content on the listener computing device if the location of the listener computing device does not correspond to the one or more locations, wherein the generic audio content is not associated with a location. In some embodiments, the method further comprises importing new audio content from an audio recording mechanism or a memory to the storage database. In some embodiments, the method further comprises associating the new audio content with one or more new locations and recording the associations on the association table. In some embodiments, creating the radio station comprises selecting content pool settings of the radio station, wherein the content pool settings comprise one or more parameters the values of which the audio content must meet in order to be played by the radio station. In some embodiments, the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content. In some embodiments, each of the locations represent an area having a size. In some embodiments, creating the radio station comprises selecting location data settings of the radio station, wherein the location data settings indicate a range of sizes that the area of one of the locations must fall within in order for the radio station to play the audio content associated with the one of the locations. In some embodiments, the location data settings indicate priorities between locations having different sized areas, wherein audio content associated with locations having prioritized sizes of areas will be played before other audio content associated with locations having lesser prioritizes sizes of areas when the listener device is in those locations.

Another aspect of the present application is directed to a computing device for providing a location based radio station. The computing device comprises a processor and an application executed by the processor configured to determine a location of a listener computing device that is accessing a radio station associated with audio content, wherein the audio content is associated with one or more locations and play the audio content on the listener computing device if the location of the listener computing device corresponds to the one or more locations associated with the audio content. In some embodiments, the processor is configured to store the audio content on a storage database and associate the audio content with the one or more locations on an association table. In some embodiments, the processor is configured to create a radio station and store the radio station in a database of stations. In some embodiments, the locations are associated with one or more times or one or more dates. In some embodiments, the process is configured to play generic audio content to the listener computing device if the location of the listener computing device does not correspond to the one or more locations, wherein the generic audio content is not associated a location. In some embodiments, the table of associations is stored on the computing device. In some embodiments, the database of stations is located on computing device. In some embodiments, the processor is configured to import new audio content from an audio recording mechanism or a memory to the storage database. In some embodiments, the processor is configured to associate the new audio content with one or more new locations and record the associations on the association table. In some embodiments, creating the radio station comprises selecting content pool settings of the radio station, wherein the content pool settings comprise one or more parameters the values of which the audio content must meet in order to be played by the radio station. In some embodiments, the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content. In some embodiments, each of the locations represent an area having a size. In some embodiments, creating the radio station comprises selecting location data settings of the radio station, wherein the location data settings indicate a range of sizes that the area of one of the locations must fall within in order for the radio station to play the audio content associated with the one of the locations. In some embodiments, the location data settings indicate priorities between locations having different sized areas, wherein audio content associated with locations having prioritized sizes of areas will be play before other audio content associated with locations having lesser prioritizes sizes of areas when the listener device is in those locations. In some embodiments, the storage database is integrated with the computing device. In some embodiments, the audio recording mechanism is integrated with the computing device. In some embodiments, the listener device is integrated with the computing device.

Yet another aspect of the present application is directed to a system for providing a location based radio station. The system comprises a storage database and a computing device coupled with the storage database, wherein the computing device comprises a processor and an application executed by the processor configured to determine a location of a listener computing device that is accessing a radio station associated with audio content, wherein the audio content is associated with one or more locations and play the audio content on the listener computing device if the location of the listener computing device corresponds to the one or more locations associated with the audio content. In some embodiments, the processor is configured to store the audio content on the storage database and associate the audio content with the one or more locations on an association table. In some embodiments, the processor is configured to create a radio station and store the radio station in a database of stations. In some embodiments, the locations are associated with one or more times or one or more dates. In some embodiments, the process is configured to play generic audio content to the listener computing device if the location of the listener computing device does not correspond to the one or more locations, wherein the generic audio content is not associated a location. In some embodiments, the table of associations is stored on the computing device. In some embodiments, the database of stations is located on computing device. In some embodiments, the processor is configured to import new audio content from an audio recording mechanism or a memory to the storage database. In some embodiments, the processor is configured to associate the new audio content with one or more new locations and record the associations on the association table. In some embodiments, creating the radio station comprises selecting content pool settings of the radio station, wherein the content pool settings comprise one or more parameters the values of which the audio content must meet in order to be played by the radio station. In some embodiments, the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content. In some embodiments, each of the locations represent an area having a size. In some embodiments, creating the radio station comprises selecting location data settings of the radio station, wherein the location data settings indicate a range of sizes that the area of one of the locations must fall within in order for the radio station to play the audio content associated with the one of the locations. In some embodiments, the location data settings indicate priorities between locations having different sized areas, wherein audio content associated with locations having prioritized sizes of areas will be play before other audio content associated with locations having lesser prioritizes sizes of areas when the listener device is in those locations. In some embodiments, the computing device is integrated with one or more selected from the group consisting of the storage database, the audio recording mechanism and the listener device.

DETAILED DESCRIPTION OF THE INVENTION

The location-based radio system described herein enables users to create one or more radio stations that automatically select audio content related to the location of the device playing the audio content. The system enables the users to record and submit new audio content associated with one or more areas, and to customize the radio stations such that they only play the desired location based audio content when in the associated locations. Although the system is described herein in reference to audio content, it is understood that the content is able to comprise textual, image, audio and/or video content.

Figure 1:
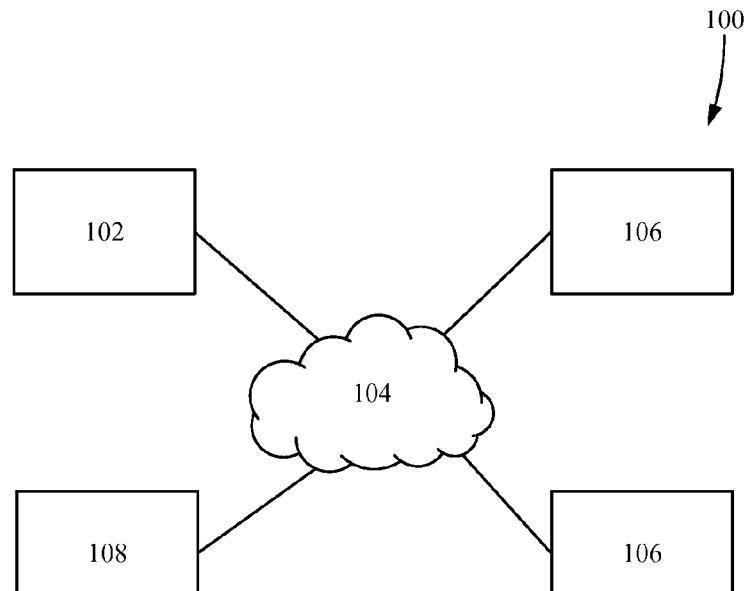
FIG. 1 illustrates a location-based radio system according to some embodiments.

FIG. 1 illustrates an location-based radio system 100 according to some embodiments. As shown in FIG. 1, the location-based radio system 100 comprises one or more creator devices 102 having an radio station creation application, one or more listener devices 106 having a radio station listening application and one or more storage elements 108 having a table of associations and a database of radio stations, all coupled together via one or more networks 104. In some embodiments, one or more of the listener devices 106 and the creator devices 102 are the same device such that one of the networks 104 comprise an internal network of the creator device 102. In some embodiments, one or more of the storage elements 108 is integrated with the creator device 102. For example, one of the storage elements 108 is able to be the local memory on the creator device 102. Alternatively, the storage elements 108 are able to be integrated with one or more of the listener devices 106 and/or are able to be remote storage devices separate from both the creator device 102 and the listener devices 106.

In some embodiments, the creation and listener applications are components or modules of a single location based radio station application that is able to be downloaded together an a user is able to utilize one or both of the modules as desired. Alternatively, the creation and listener applications are able to be separate applications that are separately downloaded. In some embodiments, the creation application is stored and runs locally on the creator device 102 and/or the listener application is stored and runs locally on the listener device 106. Alternatively, the creation application and/or the listener application are able to be partially or fully stored and/or executed remotely on a device separate from but coupled with the creator device 102 and/or listener device 106 over the network(s) 104. For example, the radio station creation application and/or listener application are able to be stored and executed on a remote server coupled to the creator device 102 and/or listener device 106 via the network(s) 104. In some embodiments, a user downloads the creation application and/or listener application onto the creator device 102 and/or listener device 106. Alternatively, the creation application and/or listener application are able to come pre-installed on the creator device 102 and/or listener device 106. In some embodiments, the table of associations and database of radio stations are stored on one or more of the storage elements 108. Alternatively, copies of the table of associations and/or the database of radio stations are able to be stored on one or more of the creator devices 102, the listener devices 106 and the storage devices 108.

In some embodiments, the creator device 102 and/or listener devices 106 comprise mobile computing devices such as a smart phone, computer or computing component within a vehicle. Alternatively, the creator device 102 and/or listener device 106 are able to comprise a mobile phone or other type of computing and/or networking device. For example, the creator and/or listener device 102, 106 are able to be Internet-based radios already installed in cars or other devices that able to interface with the applications of the system 100 via an application interface such that the Internet-based radios are able to provide both access to the radio stations on the radio station database as well as the standard radio stations. In some embodiments, the one or more networks 104 comprise the internet. Alternatively, the one or more networks 104 are able to be any combination of wired and/or wireless networks such as the internet, an ethernet or other types of networks capable of transmitting audio data as are well known in the art. For example, the network 104 is able to be a wireless internet network and/or a terrestrial radio station network. In some embodiments, the storage elements 108 comprise one or more servers. Alternatively, the storage elements 108 comprise other types of data storage/memory devices as are well known in the art.

The entries within the master database are able to be sorted/filtered by a user for selecting one or more desired entries and publishing or republishing said entries using the radio station creation application as described below. For example, a user is able to access the master database via a sorting feature of the commenting and publishing application and filter/sort the data by one or more parameters/characteristics and combinations thereof in order to return a list of filtered audio and associated data. In particular, the parameters/characteristics are able to comprise metadata of the audio data, metadata of the listener devices 106 and/or the characteristics of the audio data. For example, the parameters/characteristics are able to comprise the web address of the associated listener device 106, the source or person who created the audio data, subject of the associated listener device 106, where the audio data was created, when the audio data was created, length of the audio data, size of the audio data, format of the audio data, subject of the audio data or other characteristics of the audio data or listener devices 106 as are well known in the art. As a result, the system 100 provides the benefit of enabling a user to utilize the radio station creation application and the master database to organize, access and selectively publish all the data stored in the system 100.

Figure 2A:
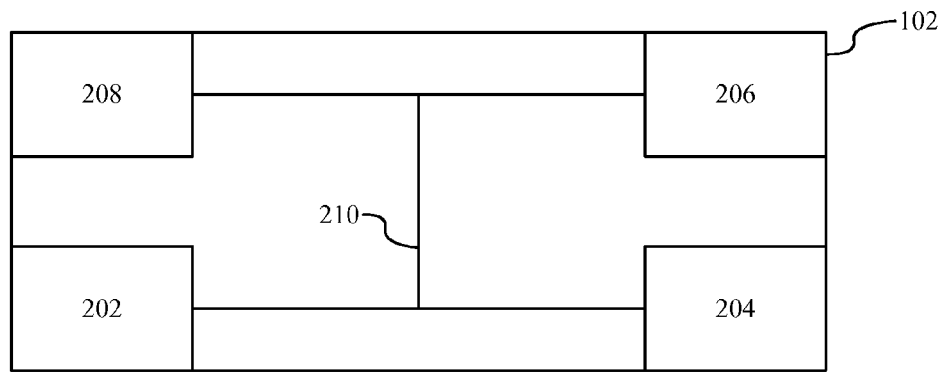
FIG. 2A illustrates a creator device according to some embodiments.

FIG. 2A illustrates the creator device 102 according to some embodiments. As shown in FIG. 2A, the creator device 102 comprises a central processing unit (CPU) 202 for executing the radio station creation application and controlling the operation of the creator device 102, a memory 204 for locally storing the radio station creation application and the recorded audio if necessary, an input/output interface 206 for inputting commands from a user and outputting the audio data to the storage elements 108 via the network(s) 104, an audio recording mechanism 208 for recording the audio and one or more buses 210 for coupling the components of the creator device 102 together. Additionally, it is understood that the creator device 102 is able to comprise one or more additional components well known in the art, which have not been included herein for the sake of brevity.

Figure 2B:
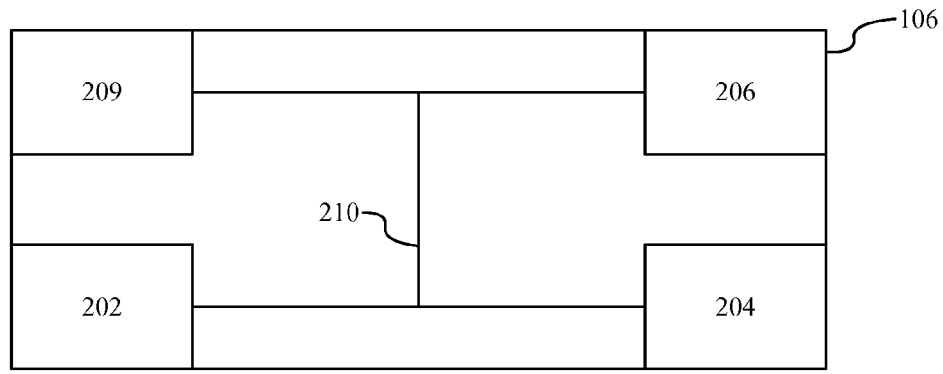
FIG. 2B illustrates a listener device according to some embodiments.

FIG. 2B illustrates the listener device 106 according to some embodiments. As shown in FIG. 2B, the listener device 106 is able to be substantially similar to the creator device 102 except for the differences described herein. Specifically, the listener device 106 comprises a central processing unit (CPU) 202 for executing the radio station listening application and controlling the operation of the listener device 106, a memory 204 for locally storing the radio station listening application, an input/output interface 206 for inputting commands from a user and outputting messages to the storage elements 108 via the network(s) 104, an audio playback mechanism 209 for playing the audio content and one or more buses 210 for coupling the components of the listener device 106 together. Additionally, it is understood that the listener device 106 is able to comprise one or more additional components well known in the art, which have not been included herein for the sake of brevity.

In some embodiments, the memory 204 comprises non-volatile memory. Alternatively, the memory 204 comprises one or both of non-volatile and volatile memory. In some embodiments, the input/output interface 206 comprises a display with a graphical user interface (GUI) for receiving commands from the user. Alternatively, the input/output interface 206 comprises one or more of a display, a GUI, a voice recognition mechanism, transceiver, device physical inputs, peripherals such as mice and keyboards, and other interface components as are well known in the art. In some embodiments, the audio recording mechanism 208 is integrated into the device 102. Alternatively, the recording mechanism 208 and/or the playback mechanism 209 are able to be peripheral devices that are coupled to the creator device 102 or listener device 106 via the network(s) 104 or another wired or wireless network. In some embodiments, the recording mechanism 208 comprises a voice recorder. Alternatively, the recording mechanism 208 is able to be other types of audio and/or video recording devices/mechanisms that are able to record any kind of sound the user desires, such as their voice to music or pre-recorded sound effects as are well known in the art. In some embodiments, the playback mechanism 209 is a speaker. Alternatively, the playback mechanism 209 is able to comprise other devices and/or software capable of playing back audio content as are well known in the art. In some embodiments, the recording mechanism 208 and/or the playback mechanism 209 comprises recording and/or playback software stored and executed on the creator device 102 or listener device 106. Alternatively, the recording and/or playback software is able to be partially or fully remotely executed and/or stored from the creator device 102 or the listener device 106. For example, the recording and/or playback software is able to be remotely stored and/or executed on a website server coupled with the creator device 102 and/or listener device 106 over the network 102. Some exemplary types of such recording and/or playback software include Quicktime that runs from a hard drive of a computer, Javasonics.com or Pubclip.com or Byoaudio.com that run from a web-based application, and Voice Memo that runs on an iPhone. Alternatively, the recording mechanism 208 and/or the playback mechanism 209 do not include recording software and the recording and/or playback functionality is implemented by the radio station creation application or the radio station listening application.

Radio Station Creation Application

The radio station creation application is able to comprise a radio station creation feature, an audio import feature and a data association feature. The radio station creation feature enables a user to create a new radio station and select one or more characteristics of that station, wherein the new station and the selected characteristics are able to be automatically added to and stored with the database of stations. The station characteristics are able to comprise the name of the station, audio content pool settings, location data settings and station access settings. These characteristics are able to be edited at any time after creation of the radio station by accessing the radio station via the radio station creation application. The audio content pool settings enable the user to select what pool of audio content the radio station will select from when automatically choosing the next content to play on the radio station. For example, the user is able to select that all the content available on the storage elements 108 or all the content listed on the table of associations be included in the content pool. Such a selection will include all content listed as public on the table of associations as well as content listed as private on the table, but that the station has access to because it meets the privacy settings associated with the private content. Alternatively, the user is able to select less than all the content available to be included in the pool by filtering the content by one or more parameters such as the title of the content, the author/narrator of the content, subject/genre of the content, length of the content, rating of the content (e.g. popularity or maturity level), source of the content (e.g. the user who added the content to the system 100), creation date of the content (e.g. when the content was added to the system or when the content was actually created), format of the content (e.g. mp3) and other content parameters as are well known in the art. As a result, only content having values that match the selected values of the parameters will be included within the content pool. Alternatively, the user is able to manually create a playlist of content from the available content such that the radio station plays the playlist of content entered instead of selecting content from the content pool. Alternatively, the user is able to manually create playlists as well as select content pool setting that the station will use to select content before, after or in between the playlist content. For example, the user is able to submit a playlist of ten items that they want to be played every five hours and the select content pool settings that the radio station is to follow in order to fill the remainder of the time. In some embodiments, the user is able to select/save multiple different content pool settings including playlists that are to be implemented at specified different times (e.g. different hours, days, months).

The location data settings enable the user to select what the radio station will play when there is no audio content within the content pool that is associated with the current location of the listener device 106 and to select what size or sizes of location areas the audio content will need to be associated with in order to be selected for playback by the radio station at a current location. In particular, when there is no audio content within the content pool that is associated with the current location of the listener device 106, the user is able to select that no content be played, that content related to the nearest location be played or that generic content be played, wherein the generic content is not associated with a location. Regarding the selection of the size or sizes of location areas, a set of audio content A is able to be associated with a small location area such as the address 123 main street, a medium location area such as the city Denver, a large location area such as the state Colorado and/or other size location areas. As a result, by selecting the location data settings a user is able to determine what size of location area the audio content needs to be associated with in order to be selected for playback when in that location. For example, the user is able to select that the content associated with any size of location area on the storage elements 108 or listed on the table of associations be included in the content pool. Again, such a selection will include all content listed as public on the table of associations as well as content listed as private on the table, but that the station has access to because it meets the privacy settings associated with the private content. Alternatively, the user is able to select less than all content associated with any size location area to be included in the pool by filtering the content by only content associated with one or more specified location area sizes, only content associated with a specified location area size or greater sizes and/or only content associated with a specified location area size or smaller sizes. As a result, the user is able to customize the radio station for interstate travels by, for example, selecting a location area size of "state" such that as a listener quickly traverses through the states the station audio content associated with each state and not content only associated with a small area of that state that is quickly passed. Similarly, the user is able to customize the radio station for intrastate travels by, for example, selection a smaller location are size of "city" such that content associated with each passed city is able to be selected.

In some embodiments, the location data settings are able to further enable the user to select priority settings between the different location area sizes and/or between audio content of the same location area sizes. For example, the user is able cause the station to prioritize content associated with the smaller location areas over larger location areas such that the content associated with the smallest location area will be selected first over any content associated with larger location areas in the same location. Alternatively, larger or specified sizes of location areas are able to be prioritized. Indeed, it is understood that the prioritization between any one size location area and all the other size location areas is able to be specified. Similarly, priority is able to be specified for content of having the same size location area based on one or more parameters such as the title of the content, the author/narrator of the content, subject/genre of the content, length of the content, rating of the content (e.g. popularity or maturity level), source of the content (e.g. the user who added the content to the system 100), creation date of the content (e.g. when the content was added to the system or when the content was actually created), format of the content (e.g. mp3) and other content parameters as are well known in the art. Additionally, in some embodiments the user is able to select/save multiple different location data settings that are to be implemented at specified different times (e.g. different hours, days, months).

The station access settings enable the user to select one or more listeners or sets of listeners that are able to edit, download or otherwise access the radio station. For example, the user is able to make the radio station public such that all listeners are able to access the radio station and listen to its content. Alternatively, the user is able to make the radio station private such that only listeners who meet one or more privacy qualifications are able to access and listen to the radio station. The privacy qualifications are able to comprise one or more of the purchase of a subscription by the listener device 106 or the user account associated with the listener device 106, a location of the listener device 106 (e.g. a building or an network access point), a password or other identification entered by the listener when attempting to access the radio station, a relationship status indicated in the system 100 of the listener and the user (e.g. friends), a selection of the listener's account on the system 100 by the user, a selection of a group on the system 100 the listener's account belongs to and other characteristics of the listener's account as are well known in the art. For example, the privacy qualifications are able to specify that the radio station is only able to be accessed by a listener device 106 located in a particular building. Indeed, this function is particular beneficial if a business desires to create a station that is only able to be accessed for playback while within the buildings of that business. The editing of the radio station is able to comprise changing one or more of the name of the station, audio content pool settings of the station, location data settings of the station and station access settings of the station. As a result, the user is able to control the extent of who is able to listen to or otherwise access the radio stations they create. Additionally, it should be noted that if the user does not select one or more of the characteristics of the station, the creation feature is able to use one or more default selections for the radio station.

Further, in some embodiments, the creation feature enables a user to sample or test a radio station they have created or are in the process of creating. For example, the user is able to interact with a map on the creator device 102 in order to manipulate an icon representing the location of a listener device 106 that is listening to the radio station being tested. As a result, the application will play or otherwise output audio content to the user just as the station would play for the a listener of the listener device 106 at the location of the icon on the map. Specifically, the feature is able to comprise any manner of outputting and/or displaying a hypothetical playlist of what the radio station would play if implemented using the currently inputted settings. Additionally, in some embodiments, the creature feature further comprises advertiser settings that enables the user to specify the types of advertising that are available on the radio station and how the advertiser is able to become an advertiser for the radio station. For example, the advertiser settings are able to comprise an automated ad import feature that enables audio content comprising ads to be added to the pool of audio content for the radio station. Further, the advertiser settings are able to comprise ad characteristics such as permissible ad length, subject matter, play times, play locations, and/or other ad characteristics. As a result, the advertiser settings are able to be used to enable an advertiser to create and submit their advertisement which will play according to the different selected settings for the radio station.

The audio import feature enables the user to record and/or import audio content for storage on the storage elements 108 and/or inclusion on the table of associations. For example, the audio import feature enables the user to select one or more files stored on the creator device 102 or accessible with the creator device 102 and import the selected files into the system 100. Alternatively, the feature enables the user to activate the recording mechanism 208 and record new content that is then stored locally and/or imported into the system such that the new content is stored on the storage elements 108 and/or inclusion on the table of associations. In some embodiments, the importation is able to comprise streaming live audio content into the system 100 and/or directly to one or more radio stations. Alternatively, the imported audio content is able to not be streamed and/or be pre-recorded. In some embodiments, the imported and/or recorded audio content is able to be edited using the audio import feature. In some embodiments, the editing capability is built into the import feature. Alternatively, the editing capability is provided by external software that the creation application is able to interface with. In some embodiments, the import feature automatically determines the location, time, date and/or other location data about audio data that is being recorded using the creation application.

In some embodiments, the import feature further enables the user to select one or more data privacy settings which are associated with one or more portions of the audio content and listed with the portions of the audio content on the table of associations. In particular, these privacy settings are able to be used to determine which listeners and/or radio stations are able to edit, download, or otherwise access the associated content. For example, the user is able to make one or more of the portions of the audio content public such that all listeners and/or radio stations are able to access the portions of audio content. Alternatively, the user is able to make one or more of the portions of audio content private such that only listeners and/or radio stations who meet the privacy settings are able to access the audio content. The privacy settings are able to comprise one or more of a password or other identification entered by the listener when attempting to access the content, a relationship status indicated in the system 100 of the listener and the user (e.g. friends), an identifier associated with the radio station that matches a list of approved identifiers, a selection of the radio station and/or the listener's account on the system 100 by the user, a selection of a group on the system 100 the radio station and/or the listener's account belongs to and other characteristics of the radio station and/or listener's account as are well known in the art. In some embodiments, the data privacy settings are selected and added to the audio content during the import process. Alternatively, the data privacy setting are able to be selected or adjusted at any time after the audio content has been imported into the system 100. The editing of the audio content is able to comprise changing one or more of the name of the content and the data association settings of the content as described below. As a result, the user is able to control the extent of who is able to listen to or otherwise access the audio content they import into the system. Additionally, it should be noted that if the user does not select one or more of the characteristics of the station, the creation feature is able to use one or more default selections for the radio station.

The data association feature enables location data, values corresponding to the content pool parameters and/or other data describing the content to be associated with the content such that the associations are recorded in the table of associations. In particular, the location data is able to comprise one or more geographical areas of one or more different sizes that the content is related to. For example, the location data is able to be a range of longitude and latitude coordinates, the name of a town, the address of a building and/or other location/area identifiers as are well known in the art. Further, in some embodiments, the location data is able to further comprise a time, date and/or whether that the content is associated with. For example, the content is able to be associated with a sunset that is able to be viewed from a location at a particular time of day when there is sunny weather. As another example, the content is able to be associated with a fair or concert that occurs at a particular location on a particular date and time. Each item of audio data of the audio content found in the table of associations is able to be associated with any number of times, locations and/or location area sizes ranging from very small (e.g. a room or smaller) to very large (e.g. continents or larger). As a result, the associations are able to be used to adjust playback of the audio content, to sort/filter the content and/or to otherwise manipulate the content.

In some embodiments, the associations are input manually by importer of the content and/or others with authorization to add associations to the content. For example, the association feature is able to present the user with a map on the user interface 206 of the creation device 102 such that the user is able to select one or more locations/areas to associate with selected audio content. As a result, these selected locations/areas are able to be used to trigger the beginning of the playing of the audio content by a radio station. Alternatively or in addition, one or more of the associations are able to be determined automatically by the system 100 during the importation process. For example, the imported audio content is able to be parsed for metadata and other data which is then able to be associated with the content. As another example, the system 100 is able to determine the position of the recording mechanism 208 when audio content is recorded and then automatically associate one or more location areas to the content based on the determined position. In some embodiments, the system 100 has access to or incorporates an audio to text conversion element such that the system 100 is able to convert imported audio into text data that is able to be automatically parsed for metadata and other data that is then associated with the audio content. In some embodiments, the association process is able to occur after the audio content is imported into the system 100. Alternatively, the audio content is able to be associated with the location settings, content pool parameter values and/or other data during the import process described above. Therefore, the radio station creation application enables user to create and customize one or more radio stations that will output selected audio content based on the customization and the location of the listener.

Radio Station Listener Application

The radio station listener application is able to comprise a radio station download feature, an audio listening feature, a location determination feature and a radio station editing feature. The radio station download feature enables a user to access the database of radio stations and download one or more stations that are available for download (e.g. public or private but accessible according to the privacy settings). For example, the download feature is able to present the user with a list of some or all of the radio stations within the database and then enables the user to utilize sort/filter functions in order to find and select the stations that the user wishes to download. In particular, the database is able to be sorted/filtered by the content pool parameters, the location settings, the station access settings and/or other data related to the radio stations. In some embodiments, the radio station listener application is able to audibly output one or more of the content pool parameters, the location settings, the station access settings and/or other data related to the radio stations such that a user is able to select one or more radio stations based on the audible output. For example, this feature is able to beneficial to a user in a vehicle that is able to hear the description of the radio stations instead of having to read them which is able to be a safety hazard while driving.

In some embodiments, the selected radio stations are downloaded such that they are able to executed wholly locally on the listener device 106. Alternatively, the radio stations are able to be downloaded such that they need to be partially or fully remotely executed on the storage elements 108 and/or other devices. For example, the downloading of a radio station is able to comprise creating a shortcut or link to the radio station on the listener device 106 and/or listener application, wherein upon selection of the shortcut/link the device 106 accesses the radio station on the storage elements 108 and/or other devices in order to utilize the station for playback. In some embodiments, the radio station listener application comprises a default radio station having one or more default settings such that a user is able to use the default radio to begin listening to the audio content without downloading any radio stations or creating any radio stations. In some embodiments, the user is able to edit one or more of the default settings in order to customize the default radio station. As a result, a user is able to quickly access audio content using the slightly customized radio station which does not require all of the setup and/or searching necessary when creating a new radio station or downloading an existing radio station. In some embodiments, the download feature also enables the user to sample one or more stations before downloading them. Specifically, the feature is able to output and/or display a hypothetical playlist of what the radio station would play to the user.

The audio listening feature enables the user to utilize standard playback operations in order to play the audio content utilizing the radio stations that have been downloaded. The playback operations are able to comprise "play," "pause," "skip," "stop," "volume adjust" or other playback operations as are well known in the art. In some embodiments, the audio listening feature further comprises one or more content feedback operations that enable the system 100 to associate content feedback with the audio content and/or radio stations. For example, the listening feature is able to include a "like" operation that a user is able to select to indicate whether they like or dislike the audio content and/or radio station. As another example, the content feedback operations are able to indicate the amount of time certain audio content plays (e.g. does the user listen to the entirety of the content?), the location of the listener device 106 when the content plays, the time of day when the content is played, the date the content is played and/or other types of feedback as are well known in the art. In some embodiments, the audio listening feature effectuates playback on the listener device 106 utilizing the playback mechanism 209 and playback software integrated within the listener application. Alternatively, the playback software used to effectuate the playback is able to be distinct from the listener application, wherein the listener application interfaces with the playback software, for example, using an application interface or other interfacing methods as are well known in the art.

The location determination feature enables the listener application to determine location feedback such as the location, direction and/or speed of the listener device 106 and adjust the selection of audio content during playback based on the location feedback. For example, the listener application and/or associated radio station are able to use the location data of table of associations, the location data settings of the radio station and determined location of the listener device 106 to select audio content associated with the current location for playback to the user. Further, in some embodiments the listener application and/or the associated radio station are able to use speed and direction feedback along with the determined location to anticipate the next location area that will be entered by the listener device 106. As a result, subsequent audio content to be played is able to be buffered based on the anticipated next location. Moreover, in some embodiments based on the location, speed, direction and the duration of the currently playing audio content, the listener application and/or radio station are able to select audio content associated with the current location having a duration such that the content will finish before or proximate to the listener device 106 exiting the area. Similarly, the listener application and/or radio station are able to select audio content associated with the anticipated next location having a duration such that by the time the content has finished playing the listener device 106 will be in the anticipated next location. In some embodiments, the speed is able to be used to determine the size of the location area to prioritize. For example, at high speeds audio content associated with a small location area will be too slow to be output to the user before the small location area is passed by the listener device 106. As a result, the size of the location areas is able to be selected based on the determined speed such that audio content is able to be fully or mostly output before the listener device 106 passes the location area associated with the content. In some embodiments, the location, speed and/or direction of the listener device 106 is determined using global positioning satellite technology. Alternatively, other location determining technology is able to be used wherein the location determining technology is able to be integrated within or separate from the listening application and/or listener device 106. In some embodiments, the location feedback is able to comprise the weather at the current location of the listener device 106 such that content associated with a particular kind of weather is able to be output by the radio station upon receiving the weather feedback.

The editing feature enables the user to edit the content pool parameters, the location settings, the station access settings and/or other data related to the downloaded radio stations. In some embodiments, if the editing of the station by the user is authorized under the access settings, the database of stations and/or the table of associations are able to be updated according to the changes made by the user. In some embodiments, the user is able to save the changes to a radio station made using the editing feature on the listener device 106 such that whenever the radio station is accessed on the listener device 106 the changes are maintained. In some embodiments, these locally saved changes are able to be made even if changes to the radio station on the database are not authorized for the user under the access settings of the station. In some embodiments, the user is able to save the radio station with the changes as a new radio station on the database of radio stations. The editing feature is able to also enable the user to edit the audio content stored on the storage elements 108 and/or the associations saved in the table to associations. For example, the user is able to change/edit one or more of the name, the access/privacy settings and/or the data association settings of the content. In some embodiments, if the editing of the content by the user is authorized under the access/privacy settings, the storage elements 108 and/or the table of associations are able to be updated according to the changes made by the user. In some embodiments, the user is able to save the changes to the content such that whenever the audio content is accessed on the listener device 106 the changes are maintained. In some embodiments, these locally saved changes are able to be made even if changes to the audio content on the storage elements 108 and/or the table of associations are not authorized for the user under the access/privacy settings of the content. In some embodiments, the user is able to save the audio content with the changes as new audio content on the storage elements 108 and/or the table of associations. As a result, the listener is able to utilize the editing feature to customize the listener application as desired.

In operation, a user of the creator device 102 utilizes creation feature of the creation application by interacting with the interface 206 of the creator device 102 to create and customize one or more radio stations that are then stored in the database of radio stations and published such that one or more listener devices 106 are able to download/access the stations. The user is also able to utilize the import feature of the creation application on the creator device 102 to record or import audio content for use by the radio stations the user created and/or other radio stations. In some embodiments, the imported/recorded audio content is stored locally on the creator device 102 and then copied or transferred onto the storage elements 108 over the network(s) 104. Alternatively, the imported/recorded audio content is able to directly stored on the storage elements 108, for example, by streaming the audio content to the storage elements 108. This imported/created content is then able to be associated with location settings, content pool parameter values and/or other data using the association feature during or after the import process. In some embodiments, the associations are automatically created and stored in the table of associations by the creation application. Alternatively, one or more of the associations are able to be made manually by the user via the creation application. A user of the listener device 106 utilizes the download feature of the listening application by interacting with the interface 206 of the listener device 106 to download/access one or more radio stations from the storage elements 108. Specifically, the user is able to sort and select which radio stations to download by filtering the stations within the station database using the sorting feature of the listening application. In some embodiments, the user of the listener device 106 is able to edit the audio content and/or radio stations using the listening application and the interface 206 to communicate with the storage elements 108 and to access the radio station database and/or table of associations. The user of the listener device 106 is then able to playback audio content on the listener device 106 using the playback feature of the listening application, wherein the playback is adjusted based on location data settings, content pool data settings and/or the access settings. In some embodiments, the interaction and use of the radio station creation application and/or the radio station listening application by the user comprises voice commands. Alternatively, the interaction comprises one or more of voice commands, the pressing of a button on the device 102/106 and/or other triggering actions as are well known in the art.

Figure 3:
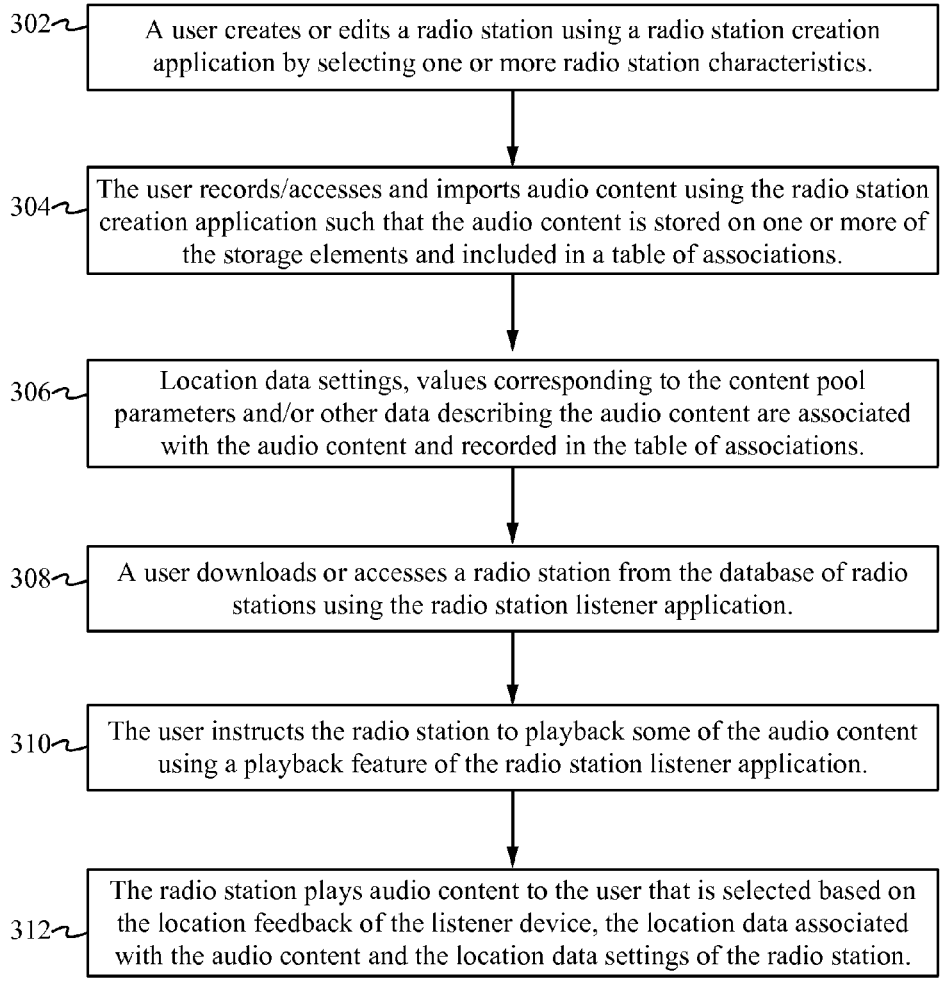
FIG. 3 illustrates a method of providing a location-based radio system according to some embodiments.

FIG. 3 illustrates a flowchart of a method of operating the location-based radio system 100 according to some embodiments. As shown in FIG. 3, a user creates or edits a radio station using a radio station creation application by selecting one or more radio station characteristics at the step 302. In some embodiments, the created radio station(s) and the selected station characteristics are stored in a radio station database. In some embodiments, selecting the station characteristics comprises determining one or more of the content pool settings, location data settings and the station access settings. The user records/accesses and imports audio content using the radio station creation application such that the audio content is stored on one or more of the storage elements 108 and included in a table of associations at the step 304. In some embodiments, the during or after the import process the user selects one or more data privacy settings to be associated with one or more items of the audio content and listed with an entry related to the items of the audio content on the table of associations. Location data settings (e.g. location areas), values corresponding to the content pool parameters and/or other data describing the audio content are associated with the audio content and recorded in the table of associations at the step 306. In some embodiments, one or more of the associations are made automatically by the radio station creation application. Alternatively, one or more of the associations are manually input by the user into the radio station creation application. Alternatively, some or all of the imported content is able to be not associated with any location data such that the audio content is generic audio content that is able to be played at any location.

A user downloads or accesses a radio station from the database of radio stations using the radio station listener application at the step 308. In some embodiments, the user selects the radio station for download by filtering the pool of radio stations on the radio station database using a filtering feature of the radio station listener application. Alternatively, the user is able to utilize a default radio station on the radio station listener application rather than downloading or otherwise accessing a station on the radio station database. In some embodiments, the user edits the content pool parameters, the location settings, the station access settings and/or other data related to the downloaded radio stations using an edit feature of the radio station listener application. In some embodiments, the user edits the audio content stored on the storage elements 108 and/or the associations saved in the table to associations using the editing feature of the radio station listener application. The user instructs the radio station to playback some of the audio content using a playback feature of the radio station listener application at the step 310. The radio station plays audio content to the user that is selected based on the location feedback of the listener device 106, the location data associated with the audio content and the location data settings of the radio station at the step 312. In some embodiments, the playing of the audio content is triggered by location feedback indicating that the listener device 106 has entered the location area associated with the audio content. In some embodiments, the radio station plays generic audio content if the listener device 106 is not in an area that is associated with any of the audio content. When the listener device 106 moves to a location that is associated with some of the audio content, the radio station is able to switch to the associated audio content. As a result, the system 100 provides the benefit of enabling a user to create and/or listen to one or more radio stations wherein the content is selected based on and therefore customized for the location of the listener 106 device playing the content.

The location-based radio system 100 described herein has numerous advantages. Specifically, the system provides the advantage of enabling each listener, based on one or more of their geographic location and behavior (e.g. driving direction, driving speed), to receive an audio program specifically for them as determined by the system 100. Specifically, a user is able to create customized radio stations that are able to automatically output customized audio content to the listeners based on their location and/or other parameters. For example, this customizing is able to be used beneficially to enable advertiser content to be highly targeted for specific location data and/or location feedback of the listener devices 106. In particular audio content comprising an advertisement is able to be played when the listener device 106 is within a five mile radius of the advertiser's business. Indeed, the system 100 enables the creation of thousands or millions of radio stations and content. It would be time and cost prohibitive for a large company to create individualized radio stations for each listener. Thus, the system 100 saves both time and cost while providing customized radio stations and audio content for listeners.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. In particular, it should be noted that although as described herein the system is in reference to audio content, the content is able to comprise image and/or video content.

What is claimed is:

1. A method of providing a location-based radio station, the method comprising:
   a. storing one or more entries of audio content on a storage database and associating each of the entries of the audio content with a time or date and a location on an association table;
   b. determining a location of a listener computing device that is accessing a radio station associated with the audio content and a current time or current date that the radio station is being accessed; and
   c. playing one of the entries of the audio content on the listener computing device based on if the determined location and the determined current time or the determined current date correspond to the location and the time or the date associated with the one of the entries of the audio content.

2. The method of claim 1, further comprising creating the radio station and storing the radio station in a database of stations.

3. The method of claim 2, further comprising playing generic audio content on the listener computing device if the location of the listener computing device does not correspond to the one or more locations, wherein the generic audio content is not associated with a location.

4. The method of claim 2, wherein the association table is stored on the storage database.

5. The method of claim 2, wherein the database of stations is located in the storage database.

6. The method of claim 2, further comprising importing new audio content from an audio recording mechanism or a memory to the storage database.

7. The method of claim 6, further comprising associating the new audio content with one or more of the locations and recording the associations in the association table.

8. The method of claim 2, wherein creating the radio station comprises selecting content pool settings of the radio station, wherein the content pool settings comprise one or more parameters the values of which the audio content must meet in order to be played by the radio station.

9. The method of claim 8, wherein the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content.

10. The method of claim 2, wherein each of the locations represent an area having a size.

11. A method of providing a location-based radio station, the method comprising:
   storing audio content on a storage database and associating the audio content with one or more locations on an association table;
   determining a location of a listener computing device that is accessing a radio station associated with the audio content; and
   playing the audio content on the listener computing device if the location of the listener computing device corresponds to the one or more locations of location data elements associated with the audio content, wherein creating the radio station comprises selecting location data settings of the radio station, wherein the location data settings indicate a range of sizes that the area of one of the locations must fall within in order for the radio station to play the audio content associated with the one of the locations.

12. The method of claim 11, wherein the location data settings indicate priorities between locations having different sized areas, wherein audio content associated with locations having prioritized sizes of areas will be played before other audio content associated with locations having lesser prioritized sizes of areas when the listener device is in those locations.

13. A non-transitory computer-readable medium storing instructions that when executed by a computing device cause the computing device to perform the method comprising:
   a. determining a location of a listener computing device that is accessing a radio station associated with audio content and a current time or current date that the radio station is being accessed, wherein each of one or more entries of the audio content is associated with a location and a time or date; and
   b. playing one of the entries of the audio content on the listener computing device based on if the determined location and the determined current time or the determined current date correspond to the location and the time or date associated with the one of the entries of the audio content.

14. The medium of claim 13, wherein the method further comprises storing the audio content on a storage database and associating the audio content with the one or more locations on an association table.

15. The medium of claim 14, wherein the method further comprises creating a radio station and storing the radio station in a database of stations.

16. The medium of claim 15, wherein the method further comprises playing generic audio content on the listener computing device if the location of the listener computing device does not correspond to the one or more locations, wherein the generic audio content is not associated with a location.

17. The medium of claim 15, wherein the method further comprises importing new audio content from an audio recording mechanism or a memory to the storage database.

18. The medium of claim 17, wherein the method further comprises associating the new audio content with one or more new locations and recording the associations on the association table.

19. The medium of claim 15, wherein creating the radio station comprises selecting content pool settings of the radio station, wherein the content pool settings comprise one or more parameters the values of which the audio content must meet in order to be played by the radio station.

20. The medium of claim 19, wherein the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content.

21. The medium of claim 15, wherein each of the locations represent an area having a size.

22. A non-transitory computer-readable medium storing instructions that when executed by a computing device cause the computing device to perform the method comprising:
- determining a location of a listener computing device that is accessing a radio station associated with audio content, wherein the audio content is associated with one or more locations; and
- playing the audio content on the listener computing device if the location of the listener computing device corresponds to the one or more locations associated with the audio content, wherein creating the radio station comprises selecting location data settings of the radio station, wherein the location data settings indicate a range of sizes that the area of one of the locations must fall within in order for the radio station to play the audio content associated with the one of the locations.

23. The medium of claim 22, wherein the location data settings indicate priorities between locations having different sized areas, wherein audio content associated with locations having prioritized sizes of areas will be played before other audio content associated with locations having lesser prioritizes sizes of areas when the listener device is in those locations.

24. A computing device for providing a location based radio station comprising:
a. a processor; and
b. an application executed by the processor configured to:
  i. determine a location of a listener computing device that is accessing a radio station associated with audio content and a current time or current date that the radio station is being accessed, wherein each of one or more entries of the audio content is associated with a location and a time or date; and
  ii. play one of the entries of the audio content on the listener computing device based on if the determined location and the determined current time or the determined current date correspond to the location and the time or the date associated with the one of the entries of the audio content.

25. The device of claim 24, wherein the processor is configured to store the audio content on a storage database and associate the audio content with the one or more locations on an association table.

26. The device of claim 25, wherein the processor is configured to create a radio station and store the radio station in a database of stations.

27. The device of claim 26, wherein the process is configured to play generic audio content to the listener computing device if the location of the listener computing device does not correspond to the one or more locations, wherein the generic audio content is not associated a location.

28. The device of claim 26, wherein the table of associations is stored on the computing device.

29. The device of claim 26, wherein the database of stations is located on computing device.

30. The device of claim 26, wherein the processor is configured to import new audio content from an audio recording mechanism or a memory to the storage database.

31. The device of claim 30, wherein the processor is configured to associate the new audio content with one or more new locations and record the associations on the association table.

32. The device of claim 26, wherein creating the radio station comprises selecting content pool settings of the radio station, wherein the content pool settings comprise one or more parameters the values of which the audio content must meet in order to be played by the radio station.

33. The device of claim 32, wherein the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content.

34. The device of claim 26, wherein each of the locations represent an area having a size.

35. A computing device for providing a location based radio station comprising:
a. a processor; and
b. an application executed by the processor configured to:
  i. determine a location of a listener computing device that is accessing a radio station associated with audio content, wherein the audio content is associated with one or more locations; and
  ii. play the audio content on the listener computing device if the location of the listener computing device corresponds to the one or more locations associated with the audio content;
wherein creating the radio station comprises selecting location data settings of the radio station, wherein the location data settings indicate a range of sizes that the area of one of the locations must fall within in order for the radio station to play the audio content associated with the one of the locations.

36. The device of claim 34, wherein the location data settings indicate priorities between locations having different sized areas, wherein audio content associated with locations having prioritized sizes of areas will be play before other audio content associated with locations having lesser prioritizes sizes of areas when the listener device is in those locations.

37. The device of claim 34, wherein the storage database is integrated with the computing device.

38. The device of claim 34, wherein the audio recording mechanism is integrated with the computing device.

39. The device of claim 34, wherein the listener device is integrated with the computing device.

40. A system for providing a location based radio station comprising:
a. a storage database; and
b. a computing device coupled with the storage database, wherein the computing device comprises a processor and an application executed by the processor configured to:
  i. determine a location of a listener computing device that is accessing a radio station associated with audio content and a current time or current date that the radio station is being accessed, wherein each of one or more entries of the audio content is associated with a location and a time or date; and
  ii. play one of the entries of the audio content on the listener computing device based on if the determined location and the determined current time or the determined current date correspond to the location and the time or the date associated with the one of the entries of the audio content.

41. The system of claim 40, wherein the processor is configured to store the audio content on the storage database and associate the audio content with the one or more locations on an association table.

42. The system of claim 41, wherein the processor is configured to create a radio station and store the radio station in a database of stations.

43. The system of claim 42, wherein the process is configured to play generic audio content to the listener computing device if the location of the listener computing device does not correspond to the one or more locations, wherein the generic audio content is not associated a location.

44. The system of claim 42, wherein the table of associations is stored on the computing device.

45. The system of claim 42, wherein the database of stations is located on computing device.

46. The system of claim 42, wherein the processor is configured to import new audio content from an audio recording mechanism or a memory to the storage database.

47. The system of claim 46, wherein the processor is configured to associate the new audio content with one or more new locations and record the associations on the association table.

48. The system of claim 42, wherein creating the radio station comprises selecting content pool settings of the radio station, wherein the content pool settings comprise one or more parameters the values of which the audio content must meet in order to be played by the radio station.

49. The system of claim 48, wherein the parameters comprise one or more selected from the group consisting of the file size of the audio content, the creation time of the audio content, the length of the audio content, the source of the audio content, the title of the audio content, the format of the audio content, the subject of the audio content, the locations associated with the content, the author of the content, genre of the content and the rating of the content.

50. The system of claim 42, wherein each of the locations represent an area having a size.

51. The system of claim 42, wherein the computing device is integrated with one or more selected from the group consisting of the storage database, the audio recording mechanism and the listener device.

52. A system for providing a location based radio station comprising:
   a. a storage database; and
   b. a computing device coupled with the storage database, wherein the computing device comprises a processor and an application executed by the processor configured to:
      i. determine a location of a listener computing device that is accessing a radio station associated with audio content, wherein the audio content is associated with one or more locations; and
      ii. play the audio content on the listener computing device if the location of the listener computing device corresponds to the one or more locations associated with the audio content;
wherein creating the radio station comprises selecting location data settings of the radio station, wherein the location data settings indicate a range of sizes that the area of one of the locations must fall within in order for the radio station to play the audio content associated with the one of the locations.

53. The system of claim 52, wherein the location data settings indicate priorities between locations having different sized areas, wherein audio content associated with locations having prioritized sizes of areas will be play before other audio content associated with locations having lesser prioritizes sizes of areas when the listener device is in those locations.

\* \* \* \* \*